June 22, 1926.
H. W. PHILLLIPS ET AL
1,589,659
VALVE
Filed May 31, 1924
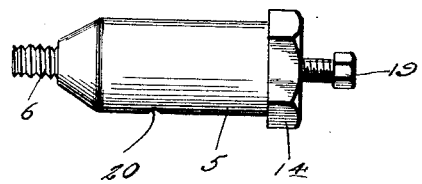
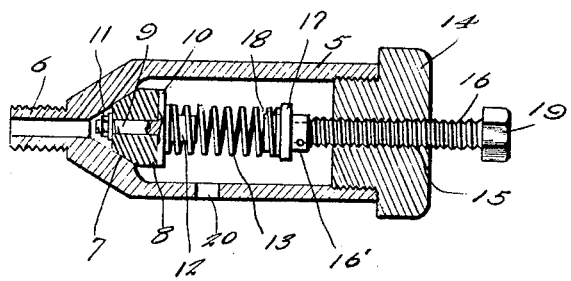
Nseeb Sayed
H.W. Phillips
INVENTOR
BY Victor J. Evans
ATTORNEY
WITNESS:

Patented June 22, 1926.

1,589,659

UNITED STATES PATENT OFFICE.

HOMER W. PHILLIPS AND NSEEB SAYED, OF GEORGETOWN, SOUTH CAROLINA.

VALVE.

Application filed May 31, 1924. Serial No. 717,166.

Our invention relates to valves and its principal object is to provide a pressure release valve for use on plumbing supply pipes to relieve the air pressure therefrom when the pipe freezes thus obviating bursting of the same.

A further object of the invention is to provide a valve which can be regulated to exert sufficient pressure to prevent the passage of water under ordinary pressure but which will open under excess pressure by the water due to the freezing thereof which of course expands as it freezes.

With the preceding and other objects and advantages in mind, the invention consists in the novel combination of elements, construction and arrangement of parts and operation to be hereinafter explicitly referred to, claimed and illustrated in the accompanying drawing, wherein:

Figure 1 is a side elevation of a valve constructed in accordance with our invention.

Figure 2 is a longitudinal sectional view of the same.

Referring to the drawings in detail wherein the corresponding characters of reference denote the corresponding parts throughout the several views, the numeral 5 designates a barrel having one end tapered and terminating in a threaded nipple 6 adapted to be received in a water supply pipe, not shown. The tapered end of the barrel 5 is provided with a conical valve seat 7 upon which a frusto-conical valve element 8 is adapted to seat. This valve element 8 is formed of rubber or other compressible material and extending centrally therethrough is a shank 9 formed with a disk 10 upon one end which overlies one end of the valve element 7. The opposite end of this shank 9 is threaded and projects beyond the smaller end of the valve element 7 and receives a nut 11 thereon. The disk 10 is formed with a boss or lug 12 upon its outer face which projects into one end of an expansion coil spring 13 arranged longitudinally within the barrel 5 and one end of which bears against the disk 10.

A removable plug 14 is threaded into the outer end of the barrel 5 and is provided with a central threaded bore 15. A screw 16 passes through this threaded bore 15 and has its inner end disposed within the barrel 5 and carries upon this inner end a swivelled collar 16' formed with an annular flange 17 and a forwardly projecting boss or lug 18. The adjacent end of the coil spring 13 is received on this boss or lug 18 and bears against the flange 17. A wrench engaging head 19 is carried by the outer end of the screw 16 whereby the screw may be adjusted to regulate the tension of the spring 13.

A vent 20 is formed in the barrel 5 in proximity to the valve seat 7 through which the excess pressure may be relieved to the atmosphere.

Under ordinary circumstances the valve 8 will be held against the seat 7 with sufficient force as to prevent the passage of water into the barrel 5. However, should freezing occur in any pipe to which the improved valve is connected, the compression formed therein due to the expansion of water will exert sufficient pressure against the valve 8 and move the same against the tension of the spring 13 and thence escape by way of the opening 20.

While we have shown and described the preferred embodiment of the invention, it is to be understood that changes in the arrangement of parts may be made and that we are only limited by the appended claim.

Having described the invention we claim:

A valve comprising a barrel casing having an end tapered and terminating in a threaded nipple adapted to be secured to a water pipe, a removable plug threaded in the opposite end of the barrel and formed with a threaded bore, a conical valve seat interiorly disposed in the tapered portion, a frusto-conical valve normally seated on said seat, a shank having a threaded end, said shank passing through said valve, a nut securing said shank in said valve, a stud on the other end of said shank, a headed screw mounted in the threaded bore, a projecting boss on the inner end of said screw, a coil spring having its end convolutions surrounding the stud and projecting boss respectively, said spring preventing the valve from being opened by ordinary water pressure but permitting it to be moved in open position by excess pressure due to freezing of water in the pipe to which the valve is attached, and said barrel having a vent opening therein.

In testimony whereof we affix our signatures.

HOMER W. PHILLIPS.
NSEEB SAYED.